United States Patent
Chen et al.

(10) Patent No.: US 10,949,272 B2
(45) Date of Patent: Mar. 16, 2021

(54) INTER-APPLICATION CONTEXT SEEDING

(71) Applicant: Microsoft Technology Licensing, LLC, Redmond, WA (US)

(72) Inventors: Liang Chen, Bellevue, WA (US); Michael Edward Harnisch, Seattle, WA (US); Jose Alberto Rodriguez, Seattle, WA (US); Steven Douglas Demar, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/008,829

(22) Filed: Jun. 14, 2018

(65) Prior Publication Data

US 2019/0384657 A1     Dec. 19, 2019

(51) Int. Cl.
| | | |
|---|---|---|
| *G06F 3/00* | (2006.01) | |
| *G06F 9/54* | (2006.01) | |
| *G06F 9/451* | (2018.01) | |

(52) U.S. Cl.
CPC .............. *G06F 9/543* (2013.01); *G06F 9/452* (2018.02)

(58) Field of Classification Search
CPC .................................. G06F 9/54; G06F 9/452
USPC ......................................................... 719/310
See application file for complete search history.

(56) References Cited

U.S. PATENT DOCUMENTS

| | | | |
|---|---|---|---|
| 5,404,442 A | 4/1995 | Foster et al. | |
| 5,911,066 A | 6/1999 | Williams et al. | |
| 5,995,103 A * | 11/1999 | Ashe | G09G 5/14 715/804 |
| 7,000,184 B2 | 2/2006 | Matveyenko et al. | |
| 7,558,822 B2 | 7/2009 | Fredricksen et al. | |
| 7,698,636 B2 | 4/2010 | Mohamed | |
| 8,191,003 B2 * | 5/2012 | Brown | G06F 3/04845 715/769 |
| 8,271,868 B2 * | 9/2012 | Sinyagin | G06F 16/972 715/234 |
| 8,495,484 B2 | 7/2013 | Ahmed et al. | |
| 8,725,729 B2 | 5/2014 | Lisa et al. | |
| 8,762,401 B2 | 6/2014 | Waggoner | |
| 8,990,235 B2 | 3/2015 | King et al. | |

(Continued)

FOREIGN PATENT DOCUMENTS

| | | |
|---|---|---|
| EP | 2581824 A1 | 4/2013 |
| WO | 2015127404 A1 | 8/2015 |

OTHER PUBLICATIONS

Nazli Goharian, Context Aware Query Classification Using Dynamic Query Window and Relationship Net. (Year: 2010).*

(Continued)

*Primary Examiner* — Lechi Truong
(74) *Attorney, Agent, or Firm* — Holzer Patel Drennan (57) ABSTRACT

The disclosed technology executes a next operation in a set of associated application windows. A first application window and a second application window are added to the set. A first context is generated from content from the first application window. A selection of the content is detected from first application window. The first context is communicated as input to the second application window, responsive to detecting the selection. The next operation in the second application window is executed using the first context as input to the next operation, responsive to communicating the first context.

14 Claims, 6 Drawing Sheets

(56) References Cited

U.S. PATENT DOCUMENTS

| | | | |
|---|---|---|---|
| 9,319,469 | B2 | 4/2016 | Ruhlen et al. |
| 9,639,511 | B2 | 5/2017 | Hariharan et al. |
| 9,652,797 | B2 | 5/2017 | Vijayaraghavan et al. |
| 9,668,103 | B1 | 5/2017 | Edwards et al. |
| 9,703,763 | B1 | 7/2017 | Zemach |
| 9,704,189 | B2 | 7/2017 | Wu et al. |
| 2005/0044526 | A1 | 2/2005 | Kooy |
| 2006/0271597 | A1 | 11/2006 | Boske |
| 2008/0082932 | A1 | 4/2008 | Beumer |
| 2009/0172573 | A1 | 7/2009 | Brownholtz et al. |
| 2010/0030813 | A1* | 2/2010 | Peyrichoux ........... G06F 16/958 |
| 2010/0333008 | A1 | 12/2010 | Taylor |
| 2011/0125733 | A1 | 5/2011 | Fish et al. |
| 2011/0161989 | A1 | 6/2011 | Russo et al. |
| 2012/0076283 | A1 | 3/2012 | Ajmera et al. |
| 2012/0166522 | A1 | 6/2012 | Maclaurin et al. |
| 2012/0331407 | A1 | 12/2012 | Ainslie et al. |
| 2013/0067377 | A1 | 3/2013 | Rogers |
| 2013/0073935 | A1 | 3/2013 | Bertot et al. |
| 2013/0311411 | A1 | 11/2013 | Senanayake et al. |
| 2014/0019975 | A1 | 1/2014 | Schmidt |
| 2014/0032468 | A1 | 1/2014 | Anandaraj |
| 2014/0033112 | A1 | 1/2014 | Landman et al. |
| 2014/0189056 | A1 | 7/2014 | St. clair et al. |
| 2014/0207622 | A1 | 7/2014 | Vijayaraghavan et al. |
| 2014/0372902 | A1 | 12/2014 | Bryant et al. |
| 2015/0106737 | A1 | 4/2015 | Montoy-Wilson et al. |
| 2015/0128058 | A1 | 5/2015 | Anajwala |
| 2015/0185995 | A1 | 7/2015 | Shoemaker et al. |
| 2015/0277675 | A1 | 10/2015 | Firestone et al. |
| 2015/0309316 | A1 | 10/2015 | Osterhout et al. |
| 2015/0370620 | A1 | 12/2015 | Lai et al. |
| 2016/0051672 | A1* | 2/2016 | Stewart .............. A61K 39/3955 600/1 |
| 2016/0139776 | A1* | 5/2016 | Donahue ............ G06F 3/04845 715/781 |
| 2016/0162172 | A1 | 6/2016 | Rathod |
| 2016/0259413 | A1 | 9/2016 | Anzures et al. |
| 2016/0328481 | A1 | 11/2016 | Marra et al. |
| 2016/0342449 | A1 | 11/2016 | Wong et al. |
| 2017/0063962 | A1 | 3/2017 | Padmanabhan et al. |
| 2017/0102871 | A1* | 4/2017 | Won ..................... G06F 3/0481 |
| 2017/0116552 | A1 | 4/2017 | Deodhar et al. |
| 2017/0124474 | A1 | 5/2017 | Kashyap |
| 2017/0139550 | A1 | 5/2017 | Milvaney et al. |
| 2017/0140285 | A1 | 5/2017 | Dotan-cohen et al. |
| 2017/0177171 | A1* | 6/2017 | Won ................... G06F 17/2235 |
| 2017/0228106 | A1 | 8/2017 | Bai et al. |
| 2017/0228107 | A1 | 8/2017 | Bhati et al. |
| 2017/0357437 | A1* | 12/2017 | Peterson .............. G06F 3/0486 |
| 2018/0025126 | A1 | 1/2018 | Barnard et al. |
| 2018/0203836 | A1 | 7/2018 | Singh et al. |
| 2018/0322136 | A1 | 11/2018 | Carpentier et al. |
| 2018/0336370 | A1 | 11/2018 | Schonwald et al. |
| 2018/0350010 | A1 | 12/2018 | Kuper et al. |
| 2019/0384460 | A1 | 12/2019 | Harnisch et al. |
| 2019/0384621 | A1 | 12/2019 | Chen et al. |
| 2019/0384622 | A1 | 12/2019 | Chen et al. |

OTHER PUBLICATIONS

"Non Final Office Action Issued in U.S. Appl. No. 16/008,889", dated Apr. 19, 2019, 15 Pages.

"Non Final Office Action Issued in U.S. Appl. No. 16/008,909", dated May 2, 2019, 11 Pages.

Ahmed, et al., "Scalable Distributed Inference fo Dynamic User Interests for Behavioral Targeting", In Proceedings of the 17th ACM SIGKDD International Conference on Knowledge Discovery and Data Mining, Aug. 21, 2011, pp. 114-122.

Anagnostopoulos, et al., "Predicting the Location of Mobile Users: A Machine Learning Approach", In Proceedings of the International Conference on Pervasive Services, Jul. 13, 2009, pp. 65-72.

Velayathan, et al., "Behavior-Based Web Page Evaluation", In Proceedings of the IEEE/WIC/ACM International Conference on Web Intelligence and Intelligent Agent Technology Workshops, Dec. 18, 2006, 4 Pages.

"Work with files and templates", Retrieved From https://helpx.adobe.com/indesign/using/files-templates.html, Nov. 6, 2017, 12 Pages.

Labaj, et al., "Tabbed browsing behaviour as a source for user modelling", In Proceedings of International Conference on User Modeling, Adaptation, and Personalization, Jun. 10, 2013, 5 Pages.

"Integration Directory Programming Interface", Retrieved From https://help.sap.com/saphelp_nw73/helpdata/en/48/d127e1e1c60783e10000000a42189d/frameset.htm, Retrieved on: Mar. 28, 2018, 3 Pages.

"Opening and editing files", Retrieved From https://syncplicity.zendesk.com/hc/en-us/articles/204500204-Opening-and-editing-files, Retrieved on: Mar. 28, 2018, 3 Pages.

"International Search Report and Written Opinion Issued in PCT Application No. PCT/US19/035896", dated Aug. 12, 2019, 14 Pages.

"International Search Report and Written Opinion Issued in PCT Application No. PCT/US19/035911", dated Aug. 12, 2019, 14 Pages.

"Final Office Action Issued in U.S. Appl. No. 16/008,889", dated Sep. 19, 2019, 12 Pages.

"Final Office Action Issued in U.S. Appl. No. 16/008,909", dated Sep. 27, 2019, 15 Pages.

Zhu, et al., "Predicting User Activity Level in Social Networks", In Proceedings of the 22nd ACM international conference on Information & Knowledge Management, Oct. 27, 2013, pp. 159-168.

"International Search Report and Written Opinion Issued in PCT Application No. PCT/US2019/035278", dated Sep. 2, 2019, 12 Pages.

Welch, et al., "Extending the Functions of the Windows Clipboard with Scrapbook+", In Journal of Microsoft Systems, vol. 3, Issue 6, Nov. 1, 1998, 8 Pages.

"International Search Report and Written Opinion Issued in PCT Application No. PCT/US2019/035899", dated Oct. 14, 2019, 11 Pages.

"Final Office Action Issued in U.S. Appl. No. 16/008,851", dated Jul. 9, 2020, 11 Pages.

"Non Final Office Action Issued in U.S. Appl. No. 16/008,851", dated Jan. 9, 2020, 15 Pages.

Non Final Office Action Issued in U.S. Appl. No. 16/008,889, dated Feb. 19, 2020, 26 Pages.

"Non Final Office Action Issued in U.S. Appl. No. 16/008,851", dated Nov. 17, 2020, 14 Pages.

* cited by examiner

INTER-APPLICATION CONTEXT SEEDING

CROSS-REFERENCE TO RELATED APPLICATIONS

The present application is related to U.S. application Ser. No. 16/008,851, entitled "Next Operation Prediction for a Workflow"; U.S. application Ser. No. 16/008,889, entitled "Surfacing Application Functionality for an Object"; and U.S. application Ser. No. 16/008,909, entitled "Predictive Application Functionality Surfacing," all of which are concurrently filed herewith and incorporated herein by reference for all that they disclose and teach.

BACKGROUND

Many user workflows involve multiple applications in multiple application windows and communicating content among them, typically using cut-n-paste or drag-and-drop functionality. For example, a user can select and copy content from one application window, switch to another application window, and paste the copied content in the other application window. More recently, share functionality allows a user to select a "share" control in one application window to open another application window based on the first application window's content. For example, a user can open a webpage in a browser window and select a share control to share the webpage with another user via a mail application. The sharing functionality may, for example, add the content of the webpage and/or a link to the webpage to a new mail item in the mail application window. These functionalities, however, remains fairly manual and provides no applied intelligence about the user's current workflow and the semantic elements of the content or related content.

SUMMARY

In at least one implementation, the disclosed technology provides execution of a next operation in a set of associated application windows. A first application window and a second application window are added to the set. A first context is generated from content from the first application window. A selection of the content is detected from first application window. The first context is communicated as input to the second application window, responsive to detecting the selection. The next operation in the second application window is executed using the first context as input to the next operation, responsive to communicating the first context.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Other implementations are also described and recited herein.

DETAILED DESCRIPTIONS

When working within a given workflow, a user may combine multiple applications into a set of associated application windows representing an organization of activities to support that workflow. In some implementations, the set of windows may constitute a "set window," as described herein, although other implementations may form a set of associated application windows using a shared property (such sharing a tag, being open in a common desktop or virtual desktop, or being part of a sharing session within a collaboration system) or other association technique. When reading a description of a figure using the term "set window," it should be understood that a set window or any set of associated application windows may be employed in the described technology.

Figure 1:
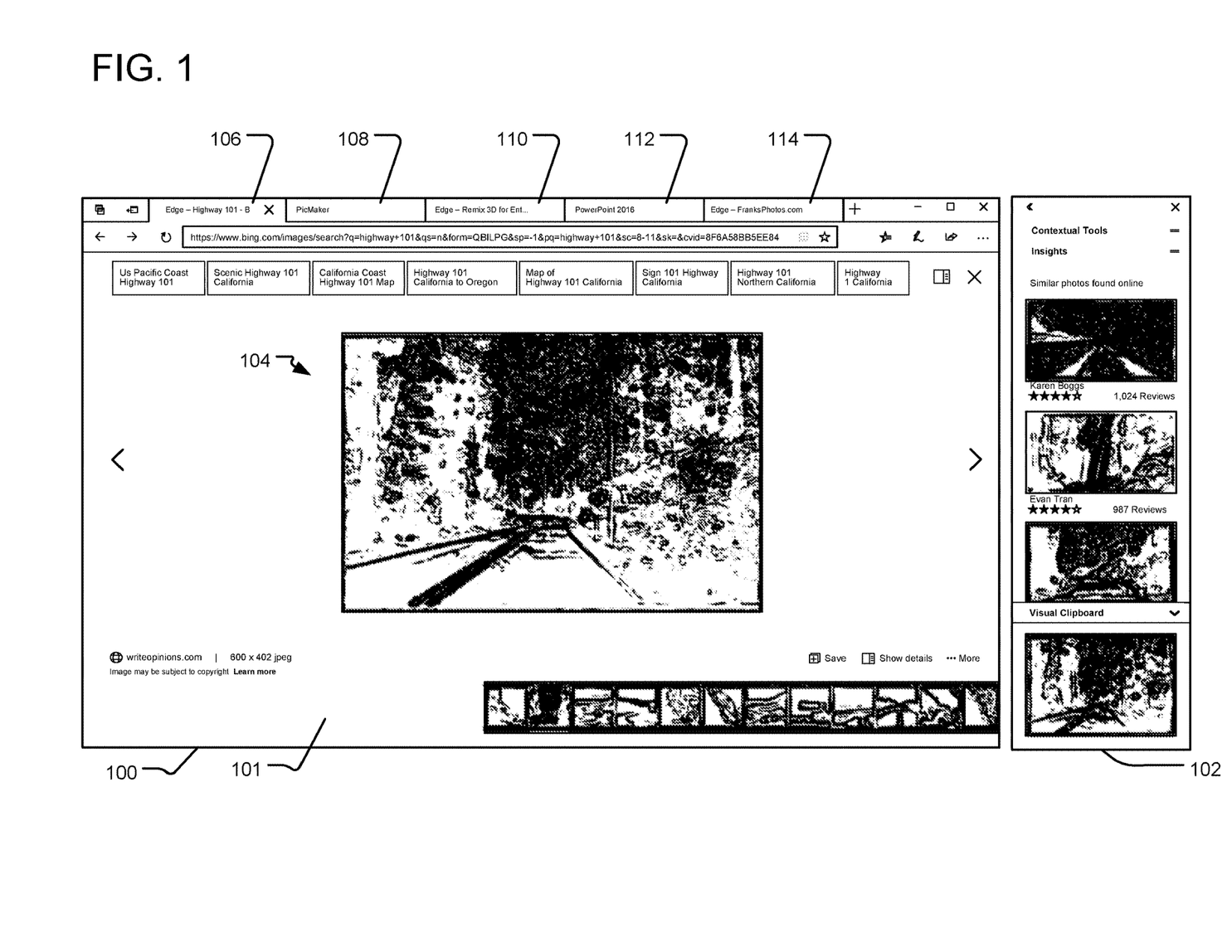
FIG. 1 illustrates an example set window providing inter-application context seeding via a visual clipboard.
Figure 2:
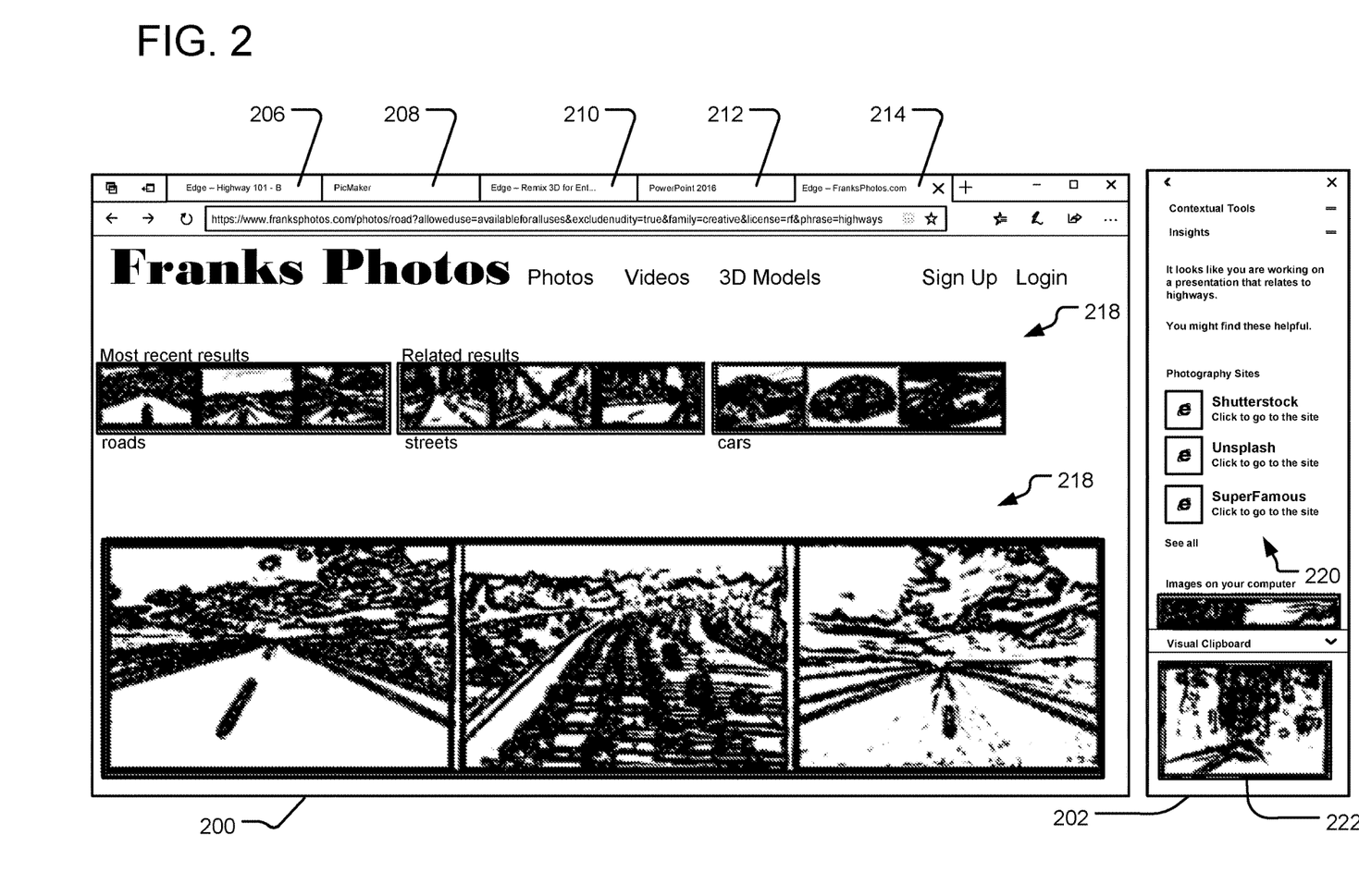
FIG. 2 illustrates an example set window 200 in which a next action of one of the application windows has been seeded via a visual clipboard.

Multiple application windows can allow a user to collect, synchronize, and/or persist the applications, data, and application states in the given workflow, although all sets of associated application windows need not provide all of these benefits. For example, a user who is developing a presentation may be working with a set of associated application windows that includes a presentation application window, a browser application window presenting results of a web search for images, an image editor application window, and a browser application window presenting images for purchase through a gallery website. In this manner, the set of associated application windows may be displayed, stored, shared, and executed as a cohesive unit, such as in a tabbed set window, as shown in FIGS. 1 and 2, or some other user interface component providing functional and visual organization to such associated application windows.

The described technology is provided in an environment in which a set of associated applications windows are grouped to interact and coordinate content and functionality among associated application windows, allowing a user to more easily track their tasks and activities, including tracking content interactions through interaction representations, in one or more computing systems in a set of the associated application windows. An interaction representation is a structured collection of properties that can be used to describe, and optionally visualize or activate, a unit of user-engagement with discrete content using a computing system or device, including a particular application window used to access the content. The content can be internal content to one or more applications (e.g., an image editing application) or external content (e.g., images from an image gallery website accessible by a browser application). In some implementations, the application and/or content may be identified by a URI (Universal Resource Identifier).

As will be described in more detail, the disclosed technologies relate to collecting data regarding user interactions with content, organizing the information, such as associating user actions with a single activity, rather than as a series of isolated actions and grouping one or more interaction representations in a set (which can represent a task), and providing user interfaces that enable the user to review interaction representations to find information of interest, and to resume a particular activity or set of activities (e.g., the activities associated with a task). In order to further assist an individual in locating a particular content interaction, or to otherwise provide context to an individual regarding user activities, the disclosed technologies can include displaying interaction representations in association with navigational mnemonics.

The disclosed technologies also relate to collections, or sets, of one or more interaction representations. Such collections or sets can also be referred to as tasks. For convenience, the term "task" is generally used in the following discussion, where the term can refer to a collection or set of one or more interaction representations. In particular implementations, a task includes (or is capable of including) multiple interaction representations. Typically, the activities of the collection or set are related in some manner, such as to achieve a particular purpose (e.g., the "task"). However, no particular relationship between interaction representations in the set or collection for the "task" is required. That is, for example, a user may arbitrarily select activities to be included in a set or collection and, as the term is used herein, may still be referred to as a "task."

Although a task typically includes a plurality of interaction representations, a task can include a single interaction representation. A task can also include other tasks or sets. Each task is typically a separate entity (e.g., a separate instance of an abstract or composite data type for an interaction representation) from the component interaction representation. For instance, a user may start a task with a particular interaction representation but may add additional interaction representations to the task as the user works on the task. In general, interaction representations can be added or removed from a task over time. In some cases, the adding and removing can be automatic, while in other cases the adding and removing is manually carried out by a user (including in response to a suggestion by a computing device to add or remove an interaction representation). Similarly, the creation of tasks can be automatic, or tasks can be instantiated by a user in particular ways. For instance, a software component can monitor user activities and suggest the creation of a task that includes interaction representations the software component believes may be related to a common purpose. The software component can employ various rules, including heuristics, or machine learning in suggesting possible tasks to be created, or interaction representations to be added to an existing task.

An interaction representation can include or be in the form of a data type, including a data type that represents a particular type of user interaction (e.g., an activity, or a task or workflow, which can include multiple activities). Data types can be useful for a particular application using interaction representation, including providing particular user interface/view of user interactions with relevant content. An interaction representation can be a serialized interaction representation or timeline, where the serialized interaction representation of a user's interaction with content, which can be useful in sending the information to other applications and or other computer devices. A serialized interaction representation, in particular implementations, may be in XML or JSON format.

FIG. 1 illustrates an example set window 100 (an example set of associated application windows) providing inter-application context seeding via a visual clipboard 102 (or any clipboard object or process). The visible application window is a browser window 101 within the set window 100 and displays an image 104 found through an image search. In the illustrated example, the user has opened the five application windows in the set window 100 to support a presentation editing workflow using the PowerPoint® presentation application associated with a tab 112. The browser window 101 is indicated by the active tab 106, and four hidden applications windows are indicated by the inactive tabs 108, 110, 112, and 114. The user can switch to any of the hidden application windows of the set window 100 by selecting one of the tabs or employing another window navigation control. It should be understood that individual application windows may be "detached" from the set window (e.g., removed from the displayed boundaries of the set window) and yet remain "in the set window" as members of the associated application windows of the set window.

The user may employ the functionality and content of hidden application windows to support the presentation editing portions of the user's workflow by providing application windows for an image editing application and for various content sources. For example, in FIG. 1, the image search of browser windows 101 and the browser windows at tab 106, displaying a webpage from FranksPhotos.com, are being used in the user's presentation editing workflow to find and obtain relevant images for a presentation.

A context seeding system can generate one or more contexts from one or more application windows within the set window and input the one or more contexts as input to a next operation in the set window. In one implementation, the user can select a different application window in the set window to trigger the context extraction and/or input of one or more contexts into the next access of the different application window. In the workflow represented in FIG. 1, the user has found the image 104 and decides that it may be a possible candidate for the presentation, but the user wants to search for other related photos on the FranksPhotos.com website, which may be a typical workflow the user has performed in the past. Accordingly, the user selects the image 104 in the application window indicated by the tab 106 and copies or drags it to the visual clipboard 102 as contextual content. The visual clipboard is an example of a storage object or process shared by the multiple applications of the set window 101. The visual clipboard can store multiple content items, and one or more content items in the visual clipboard may be tagged as contextual content, while other content items may not be deemed contextual content. It should be understood that the clipboard could be universal, shared among multiple sets, or shared only among the application windows of the set window 100. Content in a universal or shared clipboard may be tagged as contextual content for one or more sets (e.g., by tagging the content with a set identifier, such as a label, GUID, or another identifier). Furthermore, various types of content may be used as contextual content, including without limitation image data, video data, audio data, text, links, and numerical data.

Once contextual content has been identified, one of the application windows of the set window 100 can be identified by the user (or an executing process, such as an automation script) for seeding with the contextual content. For example, the user can just select the tab 114 to activate the corresponding browser window, and the contextual content will be analyzed for input data to seed a next operation in the browser window associated with the tab 114 (alternatively referred to herein as browser window 114). In this scenario, by identifying the image 104 as contextual input and switching to the browser window 114, the user has indicated a command to seed the browser window 114 with the contextual content from the image 104.

Furthermore, other sharing processes may be used in the set window 100 for context seeding, including without limitation drag-n-drop or a context menu for tagging content as contextual content. For example, the user could select the image 104 and drag it over and drop it on the tab 114 to identify the image 104 as contextual content for use in seeding a next operation in the browser session associated with the tab 114. Alternatively, a context menu or other functionality can be triggered to allow the user to tag the image 104 as contextual content and to send the image 104 for a next operation in an identified one of the associated application windows of the set window 100. Other sharing processes may also be employed.

As contextual content, the image 104 is analyzed to extract at least one context that can seed a next operation in the workflow, where the next operation is executed in the identified browser window 114. For example, context may be extracted from metadata stored in association with the image 104 (e.g., image title, image resolution, image size, keywords, a date/time stamp, geolocation data). An example of such metadata may include elements from the URI for the browser window 114, particularly the search terms "highway" and "101":

https://www.bing.com/images/search?q=highway+
101&qs=n&form=QBILPG&sp=−1&pq=highway+
101&sc=8-11&sk=&cvid=8F6A58BB5EE84

Other metadata may be extracted from EXIF information associated with the image 104. The EXIF information may be copied in raw form to the visual clipboard 102, and the context elements may be extracted from the visual clipboard, or contextual elements may be extracted from the EXIF information and then stored to the visual clipboard in association with the image 104.

In other implementations, the contextual content stored in the visual clipboard 102 may be extracted as features from the image via pattern recognition (e.g., a road, a sign, a license plate, a car type), for example, using a functionality referred to as "image insights." Such features (e.g., text extracted from an image, words extracted from an audio file, a color or color scheme) or labels for such features (e.g., the name of a person recognized in an image) can then be included in the context.

The context extracted from the contextual content is then used as input in triggering the next action in the set window 100, as the user activates another application window in the set. In summary, this context is sourced from metadata or other information extracted from content that has been designated by the user as contextual content.

In some implementation, in addition to the context extracted from the contextual content, another context is determined from the associated application windows of the set window 100. Such a context may be informed by various information sourced from other associated application windows of the set window 100, including without limitation the type of applications being run in the application windows of the set window 100 (e.g., browser, image editor, presentation application), content accessible through the application windows of the set (e.g., an image file in an image editing application window, a name of a file open in an application window, a URL open in a browser window, a search query or result in a browser window), operations being executed in other applications windows of the set (e.g., a video encoding operation, a 3D content editing operation, an image editing operation, a financial calculation in a spreadsheet), and past workflow operations by the user in association with the set window 100.

Accordingly, a first context extracted from contextual content and, in some implementations, a second content extracted from the other associated application windows of the set window 100 are combined as input to seed a next application in an identified application window of the set window 100 (e.g., the browser window 114). For example, if a first context is extracted from contextual content of a first application window of a set, such as from the image of Highway 101 shown as image 104, and the user indicates the browser window 114 with the FranksPhotos.com website as the target of the next action, then a second context may be determined from the inclusion of the presentation window 112 and the image editing window 108 of the set window 100 indicating an image search (e.g., as opposed to a video search). Accordingly, the context seeding system formats the first context extracted from the contextual content of the image 104 into an image search query for the FranksPhotos.com website in the identified browser window 114. In this manner, the next operation in the identified browser window 114 is to execute the contextually-formatted search query at FranksPhotos.com.

FIG. 2 illustrates an example set window 200, which includes a set of associated application windows, in which a next action of one of the application windows has been seeded via a visual clipboard 202. The contextual content stored in the visual clipboard 202 and/or a collection of content or characteristics within one or more of the associated application window of the set window 200 inform a context seeding system about possible user intent regarding a next operation within the set window. By analyzing either one of these factors, or the combination of these factors, including without limitation visual clipboard contents, any open application windows in the set window, open content within these associated application windows, and websites open in browser windows of a set window), the context seeding system can predicting future possible user input, as well as suggesting "insights" of user intent regarding a next operation in the set window.

In the illustrated example, after viewing the set windows shown and described with regard to FIG. 1 and copying the contextual content into the visual clipboard, the user in FIG. 2 has selected a browser window 214 (i.e., a browser window associated with a tab 214) as the visible application window within the set window 200. The five other application windows of the set window 200 are shown as hidden windows associated with tabs 206, 208, 210, and 212 to support a presentation editing workflow using the PowerPoint® presentation application associated with the tab 112. The user can switch to any of the hidden application windows of the set window 200 by selecting one of the tabs or employing another window navigation control.

Responsive to the selection or opening of the browser window 214 within the set window 200, the browser windows 214 displays results of an image search in the browser window 214 based on the following query:

https://www.franksphotos.com/photos/road?
alloweduse=availableforalluses&excludenudity=
true&family=creative&license=rf&phrase=highways The query was formatted based on a first context extracted from contextual content including an image 222, copied from the browser window 206 of the set window 200 and stored in the visual clipboard 202. In one implementation, because the type of the contextual content in the visual clipboard is an image (i.e., an image 222) and the FranksPhotos website in the browser window 214 supports photo queries, the context seeding system formats the query for "photos" (e.g., https://www.franksphotos.com/photos/ . . . ).

In other implementations, a second context is extracted from the other associated application windows of the set window 200, such as an image editing application window 208 and a presentation editor window 212. The context seeding system includes one or more intelligence modules for extracting user intent from a variety of inputs. Accordingly, given the inputs of an image editing application and a presentation editing application, the one or more intelligence modules can predict that the user intends to search the FranksPhoto.com website for "photos" (or images) rather than for "3D models" or "videos," which are also available through FranksPhotos.com. Results 218 of the photo search query on the FranksPhoto.com website are displayed in the browser window 214. In a different set window that includes a video editing application window, the context seeding system may have extracted a user intent that points to a video search, rather than a photo search and, therefore, may have formatted the query for "videos": (e.g., https://www.franksphotos.com/video/ . . . ). Accordingly, using the second context can result in a richer set of inputs for the context seeding system to use when seeding an identified application window for a next operation.

In one implementation, each application of a set window is associated with certain tags. For example, a 3D content editing application is associated with "3D" and "models"; an image editing application is associated with "images," "photos," "videos," and "filters." The visual clipboard also includes tags indicating the characteristics of the content copied to it. When the first application window detects a copy action, for example, the corresponding application tags and clipboard tags are passed along to the input formatter to format the input to the next operation in the second application window and for the purpose of scoping the resulting context in the second application window. The clipboard content tags have a higher priority than the application tags because the content tags can typically provide a more refined scope. In another implementations, the inter-application communications of formatted content are handled in accordance with registered inter-application communication protocols accessible to the input formatter and shared among multiple applications.

In some implementations, the context seeding system can also use the first context and/or the second context to seed recommendations 220 for alternatives sources of "photos." For example, by predicting that the user intends to search for photos, the context seeding system can execute a background web search (or a more local or more limited database search of related websites) for "photos," "photography," "images," "gallery," etc. and list a few links to the highest-ranking search results in the recommendations 220.

Figure 3:
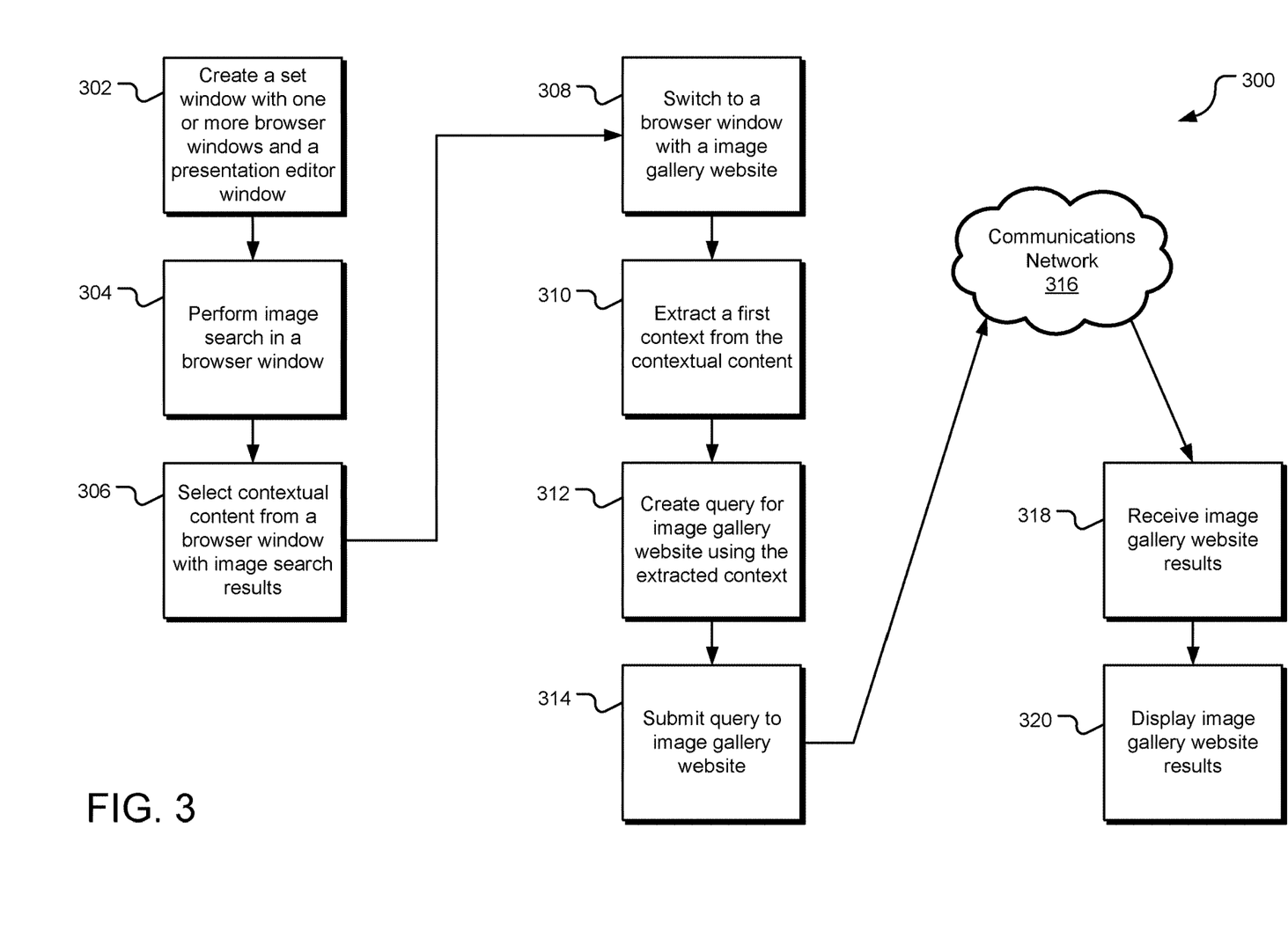
FIG. 3 illustrates an example flow of operations for inter-application context seeding.

FIG. 3 illustrates an example flow of operations 300 for inter-application context seeding. A creation operation 302 creates a set window with one or more associated application windows. In the example shown in FIG. 3, the set window includes one or more browser windows and a presentation editor window. A search operation 304 performs an image search in a browser window of the set window. A content selection operation 306 selects contextual content from a browser window that includes the image search results. Such selection may include copy-n-paste, drag-n-drop, or other methods of designating content of interest in the browser window as contextual content. In one implementation, the content of interest (and potentially associated metadata) are copied to a visual clipboard or some other application shareable storage.

A targeting operation 308 switches the set window to another browser window of the set window, this browser window presenting an image gallery website. In one implementation, after the targeting operation 308, a context extraction operation 310 extract a first context from the contextual content, such as by extracting features of the content, metadata associated with the content, etc. A query operation 312 creates a query for the image gallery website using the extracted context. By executing the context extraction operation 310 after the targeting operation 308, the context extraction operation 310 can use information about the targeted application window, such as the query format, available API (application program interface) operations, etc. Alternatively, the context extraction operation 310 can be performed before the targeting operation 308, such that the contextual content is extracted blindly in the context extraction operation 310 and then formatted in the query operation 312 for the specific browser window and the image gallery website identified in the targeting operation 308.

In an alternative implementation, a second context is extracted from the other application windows of the set window, such as by using machine learning to predict the user intent based on the user's workflow, application window types, websites, open content, etc. As previously discussed the second context can supplement the inputs to the query operation 312 to provide a more accurate seeding for the next operation in the workflow.

A submission operation 314 submits the query to the image gallery web site through the browser window of the set window and a communications network 316. A results operation 318 receives the search results from the image gallery website, and a displaying operation 320 presents the image gallery search results in the browser window of the set window.

Figure 4:
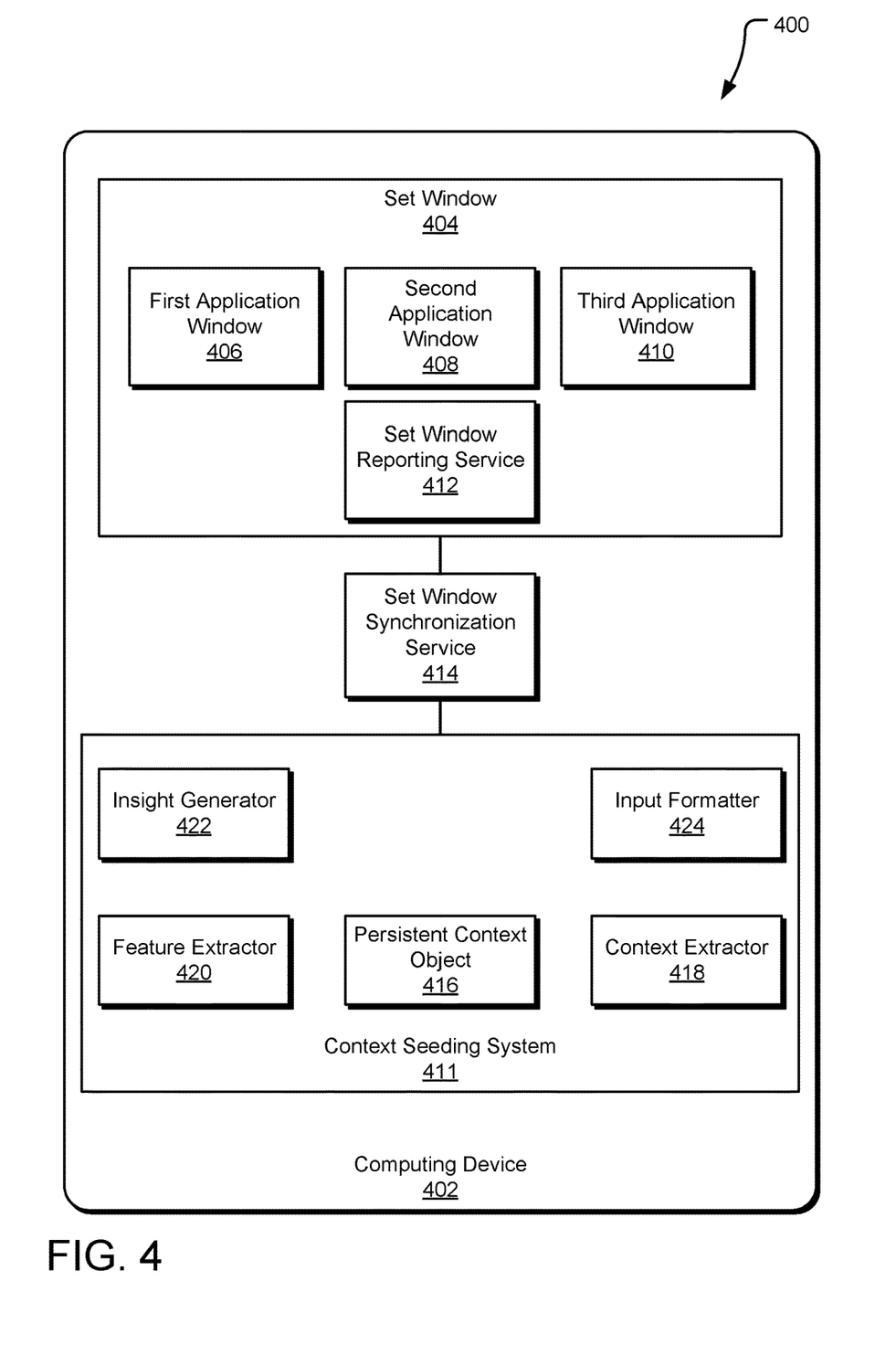
FIG. 4 illustrates an example system for inter-application context seeding.

FIG. 4 illustrates an example system 400 for inter-application context seeding. A computing device 402 includes a set window synchronization service 414 (or a set synchronization service), which manages a set window 404 and the associated application windows (such as a first application window 406, a second application window 408, and a third application window 410) within the set window 404. A set window reporting service 412 (or a set reporting service) can collect information reported by the application windows 406, 408, and 410, such as through an interface, and send the information to a set window synchronization service of the computing device 400 (or any other computing device that hosts a set window synchronization service.

The computer devices can be connected through a communications network or cloud (e.g., being connected through an internet, an intranet, another network, or a combination of networks). In some cases, the set window reporting service 412 can also send information to other computing devices, including those that include heavy-weight implementations of interaction representation and navigational mnemonic monitoring or reporting. The set window reporting service 412 can allow applications to make various calls to an interface, such as an interface that provides for the creation or modification of information regarding interaction representations, including information stored in one or more of task records, activity records, history records, and navigational mnemonic records (e.g., the task records, activity records, history records, and navigational mnemonic records, or interaction representations).

The set window synchronization service 414 can collect interaction representations from one or more of the computer devices. The collected information may be used to update interaction representations stored on one or more of the computer devices. For example, the computer devices may represent mobile devices, such as smartphones or tablet computers. A computer device may represent a desktop or laptop computer. In this scenario, the set window synchronization service 414 can send information regarding the mobile devices (e.g., interaction representations) to the desktop/laptop, so that a user of the desktop/laptop can be presented with a comprehensive view of their content-interactions across all of the computer devices, including relative to navigational mnemonics that may be common to multiple computing devices or specific to a particular computer device. In other scenarios, the computing devices may also be sent information regarding interaction representations on other computer devices.

The set window synchronization service 414 can carry out other activities. For instance, the set window synchronization service 414 can supplement or augment data sent by one computer device, including with information sent by another computer device. In some cases, the aggregation/synchronization component can associate history records for an activity carried out on one computer device with a task having another activity carried out using another of the computer devices.

The set window synchronization service 414 can also resolve conflicts between data received from different computing devices. For instance, conflicts can be resolved using a rule that prioritizes interaction representations or navigational mnemonics from different devices, prioritizes interaction representations or navigational mnemonics based on when the interaction representations or navigational mnemonics were generated, prioritizes interaction representations or navigational mnemonics based on a reporting source, such as a particular application or a shell monitor component, such as if two computer devices include interaction representations for the same activity at overlapping time periods.

For example, if a user was listening to music on two computer devices, the playback position in the same content may differ between the devices. The set window synchronization service 414 can determine the appropriate playback position to associate with the activity. Thus, the set window synchronization service 414 can determine "true" data for an interaction representation, and can send this information to one or more of the computer devices, including a computer device on which the activity was not carried out, or updating data at a device where the activity was carried out with the "true" data.

In particular implementations, information from interaction representations and navigational mnemonics can be shared between different users. Each user can have an account in the computing device, such as stored in a database. Records for interaction representations (including history records therefor) and navigational mnemonics can be stored in the database in association with an account for each user. Persisting interaction representations and navigational mnemonics in a remote computing system can be beneficial, as it can allow interaction representations and navigational mnemonics to be provided to the user, without including a file-representation that needs to be managed by a user. When information for an interaction representation or navigational mnemonic is received and is to be shared with one or more other users, the shared information can be stored in the accounts for the other users, such as using collaborator identifiers.

The distribution of information between different user accounts can be mediated by the set window synchronization service 414. In addition to distributing information to different accounts, the set window synchronization service 414 can translate or format the information between different accounts. For instance, certain properties (e.g., applications used for various types of files, file paths, account information, etc.) of interaction representations or navigational mnemonics may be specific to a user or specific devices of the user. Fields of the various records can be replaced or updated with appropriate information for a different user. Accordingly, a user account can be associated with translation rules (or mappings) defining how various fields should be adapted for the user.

The set window synchronization service 414 can also synchronize data needed to use any records received from another user, or from another device of the same user. For instance, records shared with a user may require an application or content not present on the user's device. The aggregation/synchronization component can determine, for example, whether a user's computing device has an appropriate application installed to open content associated with an interaction representation. If the application is not present, the application can be downloaded and installed for the user, or the user can be prompted to download and install the application. If the content needed for a record is not present on the user's computing device, the content can be sent to the user's computing device along with the record, or the user can be prompted to download the content. In other examples, interaction representations can be analyzed by a receiving computer device, and any missing content or software applications downloaded or installed (or other action taken, such as prompting a user to download content or install applications) by the receiving computer device.

In the case of navigational mnemonics for the same content-interaction carried out at different computer devices, in particular implementations, an interaction representation can be simply associated with all of the navigational mnemonics. In some cases, a record for a navigational mnemonic can include an identifier of a device on which the navigational mnemonic was generated, or with which the navigational mnemonic is associated (for instance, a location visited by the user as detected by a smartphone in the user's possession). Thus, this navigational mnemonic may be associated with both the determined location and the particular computing device.

A persistent context object 416 represents a storage object in which contextual content may be shared among the application windows 406, 408, and 410. In various implementations, the persistent context object 416 may include cut-n-paste functionality and storage, drag-n-drop functionality and storage, and/or any other functionality that will allow multiple applications executing in a set window to share data. The contextual content in a context seeding operation, as well as individual context elements, may be communicated among multiple applications via such a persistent context object 416.

A context seeding system 411 provides functionality for inter-application context seeding. A context extractor 418 accesses the contextual content stored within the persistent context object 416 and extracts one or more context elements, such as by extracting context elements from metadata associated with the contextual content (e.g., EXIF information associated with an image) A feature extractor 420 extracts features from the contextual content via pattern recognition (e.g., a road, spoken words, a sign, a license plate, a car type. Such features (e.g., text extracted from an image, words extracted from an audio file, a color or color scheme) or labels for such features (e.g., the name of a person recognized in an image) can then be included in the extracted context. Other contexts may be extracted from the set window 404, such as from applications executing within the set window 404, content open in the application windows of the set window 404, etc. An insight generator 422 can evaluate such varied characteristics of the set window 404 (e.g., using machine learning or other prediction technologies) to infer user intent as to the next operation to be executed within the set window.

Such extracted contexts can be used by an input formatter 424 to collect and properly format the context(s) for input to a next operation of one of the application windows of the set window 404. As previously discussed, the input formatter 424 may generate a query for input to a website or web service via a browser window. Alternatively, the input formatter 424 may have knowledge and access to an API of a selected application window in which the next operation is to be executed, inputting the appropriate context to the next operation via the API. In yet another implementation, the input formatter 424 directs the selected application window to the persistent context object 416, from which the selected application window can use its own functionality to copy the context and input to the next operation.

The system 400, using one or more of the components described herein can use content from source from one application window of the set window 404 to develop context that can seed a next operation in another application window of the set window 404. Alternatively, or additionally, the system 400 can also use information from other application windows of the set window 404 to generate an insight context assisting in the prediction of the next operation in the user's workflow, including potentially the input format for the next operation.

Figure 5:
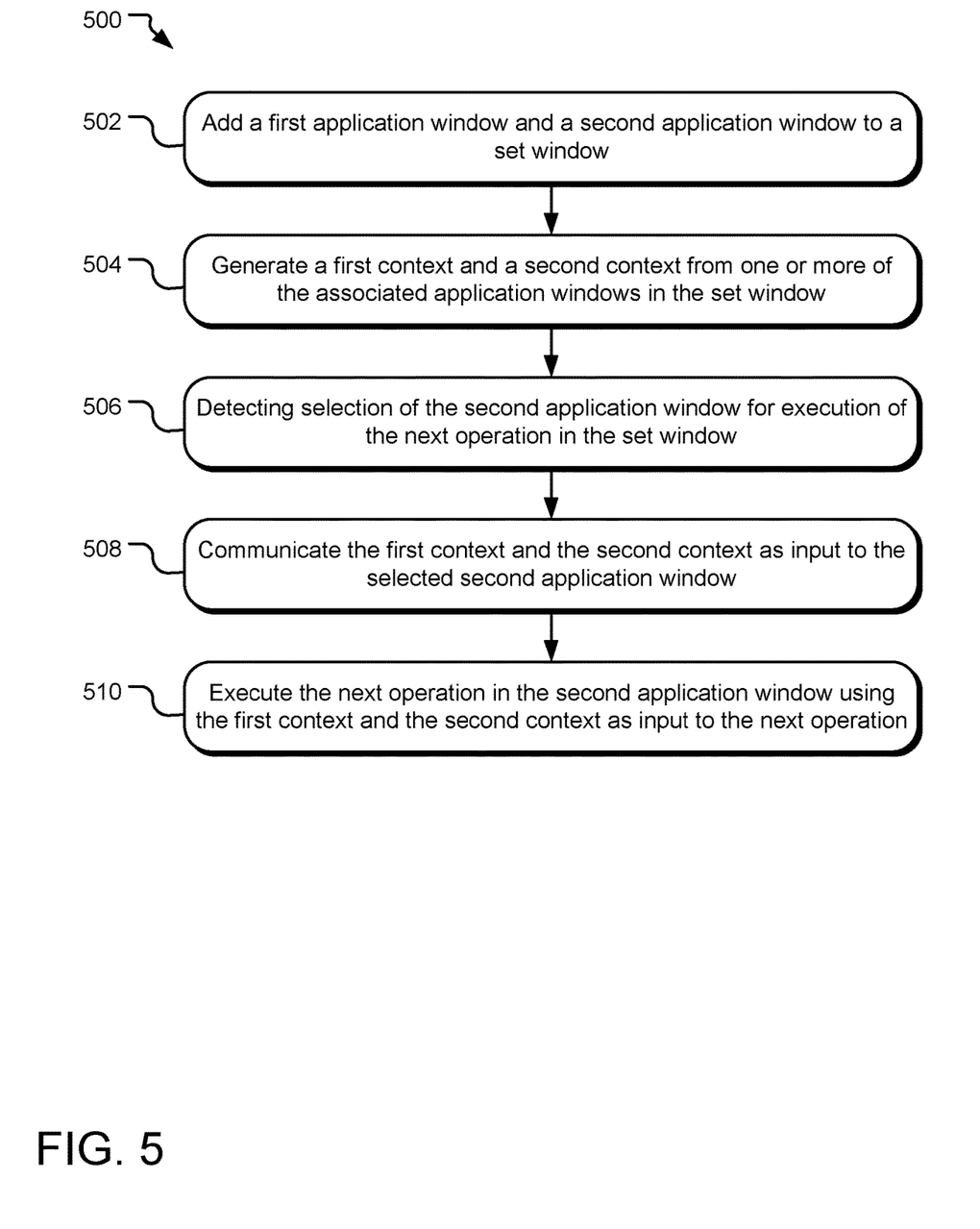
FIG. 5 illustrates example operations for inter-application context seeding.

FIG. 5 illustrates example operations 500 for inter-application context seeding. An adding operation 502 adds a first application window and a second application to a set window of associated application windows. A generating operation 504 generates a first context, and a second context (if any), from one or more of the associated application windows of the set window. In one implementation, the first context is extracted from contextual content selected from the first application window. Alternatively, the first context may be determined from characteristics of the various associated application windows in the set window, including without limitation an application window title, identity of an application executing in the application window, content accessed by an application in the application window, a prediction of the next operation based on historical user behavior in the set window, and other insights drawn from the associated application windows of the set window. Furthermore, the first context may be extracted from contextual content selected from the first application window and the second context may be determined from characteristics of the various associated application windows in the set window. In some implementation, the second context is omitted from the seeding process.

A selection operation 506 detects selection of the second application window for execution of the next operation in the set window. For example, the user can select a tab for the second application window at the top of the set window. A communication operation 508 communicates the first context, and the second context (if any), as input to the selected second application window. The context(s) may be formatted as valid input to the selected second application windows, such as in a valid query or as inputs via an API. An execution operation 510 executes the next operation in the second application window using the first context, and the second context (if any), as input to the next operation.

Figure 6:
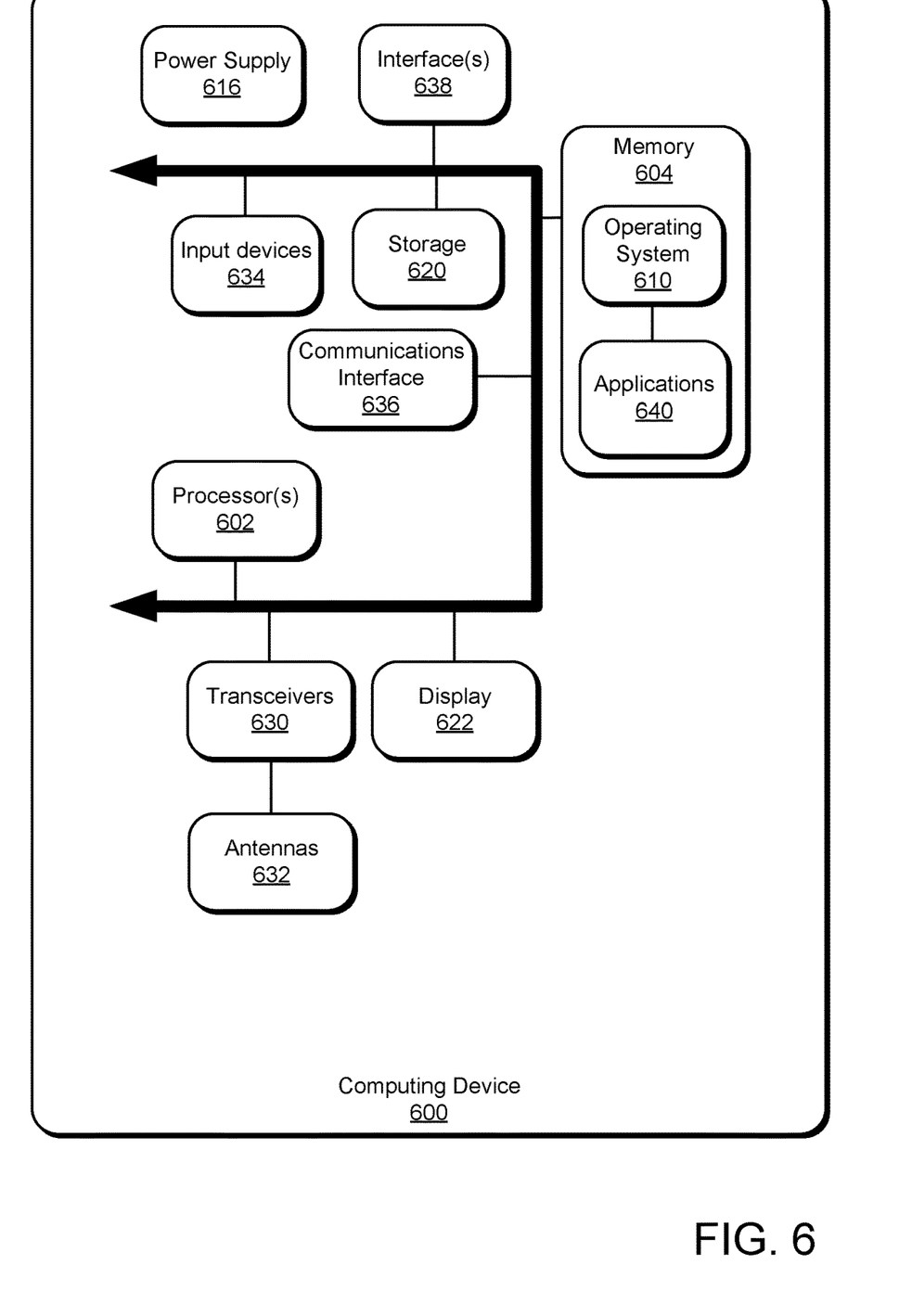
FIG. 6 illustrates an example system that may be useful in implementing the described technology.

FIG. 6 illustrates an example system that may be useful in implementing the described technology. The example computing device 600 may be used to detect the proximity of an object with respect to an antenna, such as inter-application context seeding. The computing device 600 may be a personal or enterprise computing device, such as a laptop, mobile device, desktop, tablet, or a server/cloud computing device. The computing device 600 includes one or more processor(s) 602, and a memory 604. The memory 604 generally includes both volatile memory (e.g., RAM) and non-volatile memory (e.g., flash memory). An operating system 610 and one or more applications 640 reside in the memory 604 and are executed by the processor(s) 602.

One or more modules or segments, such as an insight generator, a feature extractor, a context extractor, an input formatter, and other components are loaded into the operating system 610 on the memory 604 and/or storage 620 and executed by the processor(s) 602. Data such as user preferences, contextual content, contexts, queries, and other input, set window parameters, interactive representation and other data and objects may be stored in the memory 604 or storage 620 and may be retrievable by the processor(s). The storage 620 may be local to the computing device 600 or may be remote and communicatively connected to the computing device 600.

The computing device 600 includes a power supply 616, which is powered by one or more batteries or other power sources and which provides power to other components of the computing device 600. The power supply 616 may also be connected to an external power source that overrides or recharges the built-in batteries or other power sources.

The computing device 600 may include one or more communication transceivers 630 which may be connected to one or more antenna(s) 632 to provide network connectivity (e.g., mobile phone network, Wi-Fi®, Bluetooth®) to one or more other servers and/or client devices (e.g., mobile devices, desktop computers, or laptop computers). The computing device 600 may further include a network adapter 636, which is a type of communication device. The computing device 600 may use the adapter and any other types of communication devices for establishing connections over a wide-area network (WAN) or local-area network (LAN). It should be appreciated that the network connections shown are exemplary and that other communications devices and means for establishing a communications link between the computing device 600 and other devices may be used.

The computing device 600 may include one or more input devices 634 such that a user may enter commands and information (e.g., a keyboard or mouse). These and other input devices may be coupled to the server by one or more interfaces 638 such as a serial port interface, parallel port, or universal serial bus (USB). The computing device 600 may further include a display 622 such as a touchscreen display.

The computing device 600 may include a variety of tangible processor-readable storage media and intangible processor-readable communication signals. Tangible processor-readable storage can be embodied by any available media that can be accessed by the computing device 600 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 600. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Some implementations may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

In some implementations, the disclosed technology provides that interaction representations, such as a serialized interaction representation to timeline, can be supplied by an application (or a component of an operating system) in response to an external request. The external request can be a request from another software application or from an operating system. Providing interaction representations in response to external requests can facilitate user interface modalities, such as cut-and-paste or drag-and-drop, including in the creation of sets of associated application windows (e.g., sets of activity representations). When content is transferred to/from an application, it can be annotated with an interaction representation generated by the application (or operating system component) in response to the external request (e.g., generated by a user-interface command).

Interaction representations, in some implementations, can be updateable. Updates can be provided by an application that created an interaction representation, another application, or a component of the operating system. Updates can be pushed by an application or request from an application.

In some implementations, in addition to organizing component interaction representations, tasks can have additional properties that can assist a user. For example, the task may be represented by a user interface element that can be "pinned" or associated with various aspects of a graphical user interface—such as being pinned to a start menu, an application dock or taskbar, or a desktop. In addition, a user may choose to share tasks, or particular interaction representations of a task, such as in order to collaborate with other users to accomplish the task.

Sets can be associated with particular types, where a type can determine how sets are created and modified, and what information is included in a set. For instance, the set type can determine whether duplicate interaction representations (e.g., interaction representations associated with the same content, or the same content and the same application) can be added to a set, whether sets can be modified by a user, and whether information associated with an order or position of interaction representations in the set (e.g., a display position of content on a display device). A set type can also be used to determine what types of applications are allowed to use or modify the set (e.g., selecting to open a set may launch a different application, or application functionality, depending on the set type).

Sets, and interaction representations more generally, can also be associated with an expiration event (which could be the occurrence of a particular date or time or the passage of a determined amount of time), after which the set or interaction representation is deleted.

In order to further assist an individual in locating a particular interaction representation or task, or to otherwise provide context to an individual regarding user tasks and interaction representations, the disclosed technologies include displaying task and interaction representation information in association with navigational mnemonics. As used herein, a navigational mnemonic is information that is likely to be highly memorable to a user and can aid a user in determining whether tasks and interaction representations associated with the navigational mnemonic are, or are not, likely to be related to information they are seeking, or otherwise provide context to a display of task and interaction representation information. For instance, a user may associate a navigational mnemonic with tasks and content interactions carried out by the user in temporal proximity to a time associated with the navigational mnemonic. The time may be a time the navigational mnemonic occurred or a time that the user associates with the navigational mnemonic. The navigational mnemonic may be a significant news or entertainment event, such as the release date of a new blockbuster movie or the date of a presidential election.

Although the present disclosure generally describes navigational mnemonics used to locate past tasks and content interactions, navigational mnemonics can be provided regarding prospective tasks and interaction representations. For instance, images of a person or a location can be provided as navigational mnemonics proximate upcoming calendar items for a task or interaction representation.

As an example of a navigational mnemonic that is relevant to a particular user, a location, such as where the individual took a vacation, may be particularly memorable to the individual at various times, such as when they booked their vacation, or when they left for, or returned from, their vacation. Thus, some potential navigational mnemonics, such as news stories, may be relevant to a large number of individuals, while other navigational mnemonics may be relevant to a single individual, or may be relevant in different ways to different users. In various embodiments, a computer device (for example, an operating system of a computer device, or a component thereof), can select navigational mnemonics based on heuristics, user behavior (including a particular user or a collection of users), using a determined feed service, using promotional sources, based on applications or services used or designated by a user, or combinations thereof.

Navigational mnemonics can be displayed proximate information regarding tasks and interaction representations that a user is likely to associate with the navigational mnemonic. If the individual recalls the task or activity they are looking for as "not associated with a displayed navigational mnemonic," the user can scroll more quickly through the displayed tasks and interaction representations, including until the user recognizes a navigational mnemonic associated with the task or interaction representation they are seeking. If the user associates a displayed navigational mnemonic with a task or interaction representation of interest, the user can look more closely at associated tasks and interaction representations, including selecting to display more detailed information for tasks or interaction representation associated with the navigational mnemonic.

In at least some cases, interaction representations displayed to a user can include features that enable the user to provide input to resume the task or content interaction. For example, if the interaction representation represents watching a movie, the user can be presented with information regarding that activity, and, if the user selects the activity, the user may be taken to an application capable of displaying the movie (such as the application on which the movie was originally viewed), the movie can be loaded into the application, can be forwarded to the position where the user left off watching the movie, and playback can be resumed. For tasks, one or more of the constituent activities of the set of activities associated with the task can be resumed. In the scenario of a user resuming a work-related task, resuming the task might involve navigating to a particular web page using a web browser, loading a document in a word processing program, and loading a presentation in a presentation authoring program.

In some implementations, a task or activity (including one or more activities associated with a task) can be resumed at a device other than a device on which the task or activity was originally (or last) conducted, or the task or activity can be initiated at a device other than a device at which the task or activity will be resumed. Similarly, navigational mnemonics can be provided on one device that are associated with another device, including user tasks and activities on the other device.

Information regarding user tasks, interaction representations, and navigational mnemonics can be collected across multiple devices and distributed to devices other than the device on which the task or interaction representation was generated, including through an intermediate service or one of the computer devices that serves as a master repository for user data, or directly between devices. In particular cases, an intermediate service, such as a cloud-based service, collects interaction representation information from multiple computing devices of a user, and reconciles any differences between task and interaction representation information, and navigational mnemonics, from the devices. The intermediate service (or master device) can thus serve as an arbiter of "truth," and can distribute task and interaction representation information, and navigational mnemonics, to the user's devices, including such that a particular device may be provided with interaction representation information and navigational mnemonics for other user devices, or updated information can be provided for the particular devices. In this way, displays can be provided that allow a user to view their activity, in association with one or more navigational mnemonics, across multiple computing devices. In a similar manner, the intermediate service can allow information to be shared between multiple users (each of which may be associated with multiple computer devices).

Thus, the disclosed technologies can provide a number of advantages, including:
 interaction representations that can be generated by applications during their normal execution or in response to an external request;
 interaction representations that can be converted between data type representations and serialized interaction representations;
 modifying system data types (e.g., shareable data types) to support user interface actions such as copy and paste and drag and drop, including annotating content with information regarding associated interaction representations and transfer of interaction representations using such system data types;
 interaction representations that include entity metadata, visualization information, and activation information;
 interaction representations that can be associated with metadata schema of one or more types;
 interaction representations that can include visualization information having various degrees of complexity;
 interactions representations to which additional metadata fields can be associated, and metadata values modified;
 interaction representations that can be shared across different devices and platforms, including between different operating systems;
 interaction representations having updatable content or application information, which can help representations stay synchronized or up to date;
 interaction representations that can represent collections of interaction representations;
 collections of interaction representations having different types, where a type can be associated with particular properties or rules; and
 collections of interaction representations, where the collection, or a member thereof, is associated with an expiration event.

These technologies relate to the technical field of computer science, as they collect, distribute, and arbitrate information relating to a user's tasks and content interactions on one or more computing devices and facilitate further user interaction. The disclosed serializable interaction representation can facilitate sharing information regarding user content interactions between applications and computing device. The disclosed technologies also provide for an application to generate an activity representation on demand, which can facilitate forming sets of interaction representations and supporting user interface actions, such as drag and drop and copy and paste.

An example method of executing a next operation in a set of associated application windows includes adding a first application window and a second application window to the set and generating a first context from content of the first application window. The example method further includes detecting selection of the second application window for execution of the next operation, communicating the first context as input to the second application window, responsive to detecting the selection, and executing the next operation in the second application window using the first context as input to the next operation, responsive to communicating the first context.

Another example method of any previous method is provided wherein the communicating operation includes tagging the selected content from the first application window as contextual content and communicating the selected content to a persistent context object accessible by the second application window.

Another example method of any previous method is provided wherein the communicating operation includes dragging selected content from the first application window as contextual content to a persistent context object accessible by the second application window.

Another example method of any previous method is provided wherein the communicating operation includes storing the selected content from the first application window in a shared set memory accessible to the associated application windows of the set to persist the selected content as contextual content.

Another example method of any previous method is provided wherein the operation of generating the first context includes extracting metadata associated with the selected content, the extracted metadata having elements being included in the first context.

Another example method of any previous method is provided wherein the operation of extracting the first context includes extracting features from the selected content using pattern recognition, the extracted features being included in the first context.

Another example method of any previous method is provided wherein the executing operation includes formatting the first context as valid input to the next operation of the second application window and inputting the formatted first context to the next operation of the second application window.

Another example method of any previous method further includes determining a second context based on an identity of at least one of the application windows of the set.

Another example method of any previous method further includes determining a second context based on different content from at least one other application window of the set.

Another example method of any previous method wherein the executing operation includes determining a second context from at least one of the application windows of the set, formatting a combination of the first context and the second context as valid input to the next operation of the second application window, and inputting the formatted combination to the next operation of the second application window.

An example system for executing a next operation in a set of associated application windows includes one or more processors, a set synchronization service executed by the one or more processing units and configured to add a first application window and a second application window to the set, a context extractor executed by the one or more processing units, coupled to the set synchronization service, and configured to generate a first context from content of the first application window, a set reporting service executed by the one or more processing units, coupled to the set synchronization service, and configured to detect selection of the second application window for execution of the next operation, a persistent context object coupled to the set synchronization service and configured to store the first context and provide access to the first context by the associated application windows, and an input formatter executed by the one or more processing units, coupled to the set synchronization service, and configured to communicate the first context as input to the selected second application window. The one or more processing units execute the next operation in the second application window using the first context as input to the next operation.

The example system of any preceding system is provided wherein the input formatter formats the first context as a valid input to the next operation of the second application window and inputs the formatted first context to the next operation of the second application window.

The example system of any preceding system is provided wherein the input formatter formats the first context as valid input to the next operation of the second application window and inputs the formatted first context to the next operation of the second application window.

The example system of any preceding system is provided wherein the context extractor determines a second context from at least one of the application windows of the set, and the input formatter formats a combination of the first context and the second context as valid input to the next operation of the second application window and inputs the formatted combination to the next operation of the second application window.

One or more tangible processor-readable storage media of a tangible article of manufacture encoding processor-executable instructions for executing on an electronic computing system an example process executing a next operation in a set of associated application windows is provided and the process includes adding a first application window and a second application window to the set, generating a first context from content of the first application window, detecting selection of the second application window for execution of the next operation, communicating the first context as input to the second application window, responsive to detecting the selection, and executing the next operation in the second application window using the first context as input to the next operation, responsive to communicating the first context.

The one or more tangible processor-readable storage media of any previous tangible processor-readable storage media wherein the communicating operation includes storing the selected content from the first application window in a shared set memory accessible to the associated application windows of the set to persist the selected content as contextual content.

The one or more tangible processor-readable storage media of any previous tangible processor-readable storage media wherein the operation of generating the first context includes extracting metadata associated with the selected content, the extracted metadata having elements being included in the first context.

The one or more tangible processor-readable storage media of any previous tangible processor-readable storage media wherein the operation of extracting the first context includes extracting features from the selected content using pattern recognition, the extracted features being included in the first context.

The one or more tangible processor-readable storage media of any previous tangible processor-readable storage media wherein the executing operation includes formatting the first context as valid input to the next operation of the second application window and inputting the formatted first context to the next operation of the second application window.

The one or more tangible processor-readable storage media of any previous tangible processor-readable storage media wherein the executing operation includes determining a second context from at least one of the application windows of the set, formatting a combination of the first context and the second context as valid input to the next operation of the second application window, and inputting the formatted combination to the next operation of the second application window.

An example system for executing a next operation in a set of associated application windows includes means for adding a first application window and a second application window to the set and means for generating a first context from content of the first application window. The example method further includes means for detecting selection of the second application window for execution of the next operation, means for communicating the first context as input to the second application window, responsive to detecting the selection, and means for executing the next operation in the second application window using the first context as input to the next operation, responsive to communicating the first context.

Another example system of any previous system is provided wherein the communicating means includes means for tagging the selected content from the first application window as contextual content and means for communicating the selected content to a persistent context object accessible by the second application window.

Another example system of any previous system is provided wherein the communicating means includes means for dragging selected content from the first application window as contextual content to a persistent context object accessible by the second application window.

Another example system of any previous system is provided wherein the communicating means includes means for storing the selected content from the first application window in a shared set memory accessible to the associated application windows of the set to persist the selected content as contextual content.

Another example system of any previous system is provided wherein the means for generating the first context includes means for extracting metadata associated with the selected content, the extracted metadata having elements being included in the first context.

Another example system of any previous system is provided wherein the means for extracting the first context includes means for extracting features from the selected content using pattern recognition, the extracted features being included in the first context.

Another example system of any previous system is provided wherein the executing means includes means for formatting the first context as valid input to the next operation of the second application window and means for inputting the formatted first context to the next operation of the second application window.

Another example system of any previous system further includes means for determining a second context based on an identity of at least one of the application windows of the set.

Another example system of any previous system further includes means for determining a second context based on different content from at least one other application window of the set.

Another example system of any previous system wherein the executing means includes means for determining a second context from at least one of the application windows of the set, means for formatting a combination of the first context and the second context as valid input to the next operation of the second application window, and means for inputting the formatted combination to the next operation of the second application window.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A method of executing a next operation in a set of associated application windows, the method comprising: adding a first application window and a second application window to the set: generating a first context from content of the first application window; generating a second context using a different generation process than a generation process from which the first context is generated, wherein the first context and the second context are different than the content of the first application window; detecting selection of the second application window for execution of the next operation; communicating the first context and the second context as input to the second application window, responsive to detecting the selection; and executing the next operation in the second application window using input to the next operation that is based on the first context and the second context, responsive to communicating the first context and the second context;
   wherein the operation of extracting the first context comprises: extracting features from the selected content using pattern recognition, the extracted features being included in the first context; formatting the first context as valid input to the next operation of the second application window; and inputting the formatted first context to the next operation of the second application window.

2. The method of claim 1 wherein the communicating operation comprises: tagging the selected content from the first application window as contextual content; and communicating the selected content to a persistent context object accessible by the second application window.

3. The method of claim 1 wherein the communicating operation comprises: dragging selected content from the first application window as contextual content to a persistent context object accessible by the second application window.

4. The method of claim 1 wherein the communicating operation comprises: storing the selected content from the first application window in a shared set memory accessible to the associated application windows of the set to persist the selected content as contextual content.

5. The method of claim 1 wherein the operation of generating the first context comprises: extracting metadata associated with the selected content, the extracted metadata having elements being included in the first context.

6. The method of claim 1 further comprising: determining the second context based on an identity of at least one of the application windows of the set.

7. The method of claim 1 further comprising: determining the second context based on different content from at least one other application window of the set.

8. The method of claim 1 wherein the executing operation comprises: formatting a combination of the first context and the second context as valid input to the next Operation of the second application window; and inputting the formatted combination to the next operation of the second application window.

9. A system for executing a next operation in a set of associated application windows, the system comprising: one or more processors; a set synchronization service executed by the one or more processing units and configured to add a first application window and a second application window to the set; a context extractor executed by the one or more processing units, coupled to the set synchronization service, and configured to generate a first context from content of the first application window and determine a second context from at least one of the application windows of the set using a different generation process than a generation process from which the first context is generated, wherein the first context and the second context are different than the content of the first application window; a set reporting service executed by the one or more processing units, coupled to the set synchronization service, and configured to detect selection of the second application window for execution of the next operation; a persistent context object coupled to the set synchronization service and configured to store the first context and provide access to the first context by the associated application windows; and an input formatter executed by the one or more processing units, coupled to the set synchronization service, and configured to format a combination of the first context and the second context as valid input to a next operation and communicate the valid input to the selected second application window, the one or more processing units executing the next operation in the second application window using the valid input as input to the next operation of the second application window;

wherein the operation of extracting the first context comprises: extracting features from the selected content using pattern recognition, the extracted features being included in the first context; formatting the first context as valid input to the next operation of the second application window; and inputting the formatted first context to the next operation of the second application window.

10. One or more tangible processor-readable storage media of a tangible article of manufacture encoding processor-executable instructions for executing on an Microsoft electronic computing system a process executing a next operation in a set of associated application windows, the process comprising: adding a first application window and a second application window to the set; generating a first context from content of the first application window; generating a second context using a different generation process than a generation process from which the first context is generated, wherein the first context and the second context are different than the content of the first application window; detecting selection of the second application window for execution of the next operation; communicating the first context and the second context as input to the second application window, responsive to detecting the selection; and executing the next operation in the second application window using input to the next operation that is based on the first context and the second context, responsive to communicating the first context and the second context;

wherein the operation of extracting the first context comprises: extracting features from the selected content using pattern recognition, the extracted features being included in the first context; formatting the first context as valid input to the next operation of the second application window; and inputting the formatted first context to the next operation of the second application window.

11. The one or more tangible processor-readable storage media of claim 10 wherein the communicating operation comprises: storing the selected content from the first application window in a shared set memory accessible to the associated application windows of the set to persist the selected content as contextual content.

12. The one or more tangible processor-readable storage media of claim 10 wherein the operation of generating the first context comprises: extracting metadata associated with the selected content, the extracted metadata having elements being included in the first context.

13. The one or more tangible processor-readable storage media of claim 10 wherein the operation of extracting the first context comprises: extracting features from the selected content using pattern recognition, the extracted features being included in the first context; formatting the first context as valid input to the next operation of the second application window; and inputting the formatted first context to the next operation of the second application window.

14. The one or more tangible processor-readable storage media of claim 10 wherein the executing operation comprises: determining the second context from at least one of the application windows of the set; formatting a combination of the first context and the second context as valid input to the next operation of the second application window; and inputting the formatted combination to the next operation of the second application window.

* * * * *